United States Patent
Waskowsky

[15] 3,692,043
[45] Sept. 19, 1972

[54] SAFETY APPLIANCE

[72] Inventor: Carl A. H. M. Waskowsky, Oberglatt, Zurich, Switzerland

[73] Assignee: Patinvest Patent-und Investment A.G., Chur, Switzerland

[22] Filed: Feb. 26, 1970

[21] Appl. No.: 14,517

[30] Foreign Application Priority Data

March 11, 1969 Germany..........P 19 12 168.7

[52] U.S. Cl. ................. 137/315, 137/460, 137/462, 137/498, 137/550, 251/15
[51] Int. Cl. ............................................. F16k 17/24
[58] Field of Search......137/315, 460, 462, 498, 550, 137/624.14; 251/16, 15, 20

[56] References Cited

UNITED STATES PATENTS

| | | |
|---|---|---|
| 3,094,142 | 6/1963 | Fairbanks................251/15 X |
| 3,184,211 | 5/1965 | Chapman....................251/15 |
| 2,592,486 | 4/1952 | Stark............................251/16 |
| 3,085,589 | 4/1963 | Sands....................137/462 X |
| 3,451,414 | 6/1969 | Buford..............137/624.14 X |
| 3,511,278 | 5/1970 | Good....................137/624.14 |
| 3,297,260 | 1/1967 | Barlow..................137/550 X |
| 3,407,841 | 10/1968 | Semon..................137/550 X |

*Primary Examiner*—Harold W. Weakley
*Attorney*—Karl F. Ross

[57] ABSTRACT

A safety appliance for preventing an excessive flow of a fluid, e.g. upon a rupture of a pipe or hose leading to a machine or container to which the fluid is supplied under pressure.

25 Claims, 4 Drawing Figures

INVENTOR
Carl A.H.M. Waskowsky

BY       Karl F. Ross
           ATTORNEY

INVENTOR
Carl A.H.M. Waskowsky

BY Karl F. Ross

ATTORNEY

SAFETY APPLIANCE

The present invention relates to a safety appliance which comprises an automatically operating outlet valve and is to be inserted into a line through which a fluid, either a liquid or a gas, is supplied under pressure to a load.

When filling, for example, bathtubs or other open containers or the vessels of laundry or dish-washing machines or the like, the problem always occurs that owing to to carelessness of the person who should supervise the filling operation, or because of a defect in the control elements of such a machine or apparatus, an excessive amount of the liquid or gas might be supplied to the respective container and that considerable damage might result from the overflow of the excess liquid or by the discharge of the excess gas to the outside. It is also possible that leaks may occur in the containers or conduits of such machines or that a pipe or hose for supplying the fluid to the machine might burst.

It is therefore an object of the present invention to provide a safety appliance which is to be inserted into a line through which a liquid or gas is to be conveyed, and which shuts off the flow of this fluid through this line in the event of a defect in the machine, apparatus or other fluid-consuming load, or in the part of the line leading thereto from the safety appliance, so as to prevent any major damage.

According to the invention this object is attained by providing the safety appliance with an outlet including means responsive to the drop in pressure occurring when the fluid passes therethrough, and by further providing the safety appliance with a retarding mechanism which is likewise responsive to the pressure drop and limits the throughflow of the fluid to a certain quantity which co-operating with an outlet valve so that the latter will be shut off when this quantity has been discharged. This retarding mechanism is adapted to be returned, preferably automatically, to its original position as soon as the desired quantity of fluid has passed through the appliance. By virtue of this combination of an outlet valve with a retarding mechanism, and the ability of returning the latter to its normal position, it is therefore possible, for example, to supply periodically a predetermined quantity of water to an automatic clothes or dish washer during its cycle of operation without causing the outlet valve of the safety appliance to be closed, whereas upon a consumption of a greater quantity of water at a point downstream of the safety appliance, which may be due to negligence or defect, the outlet valve of the appliance co-operating with the retarding mechanism will be actuated so as to close and thus to stop any further flow of water to the discharge line leading to the machine.

According to another important feature of the invention, the housing of the appliance consists of two preferably separable parts respectively provided with an inlet nipple and an outlet nipple. The interior of the housing is divided by a perforated transverse partition into an antechamber and a retarding chamber which contains the retarding mechanism, these two chambers being interconnected by an inlet valve mounted on and co-operating with this partition.

In order to prevent the essential elements of the safety appliance from being clogged by solid impurities which might be contained in the fluid stream, the appliance is preferably provided with a screen through which all the fluid admitted through the inlet nipple of the appliance has to pass. In order to permit this screen to be easily cleaned or replaced, the various components of the appliance including this screen are preferably mounted inside the two-part housing in such a manner that, after the line connected to the outlet nipple has been disconnected from the latter and the lower or outlet part of the housing is unscrewed from the upper or inlet part, all the components of the apparatus will be removed with the lower part or become accessible for removal upon the detachment thereof from the upper part.

According to another feature of the invention, the aforementioned outlet valve located adjacent the outlet opening of the retarding chamber is preferably provided with an apertured supporting disk whose outer edge is mounted on a resilient bearing element which is elastically deformable in the axial direction and is, in turn, supported on the bottom of the retarding chamber around the outlet opening of the latter. This supporting disk is preferably secured to or integral with a valve cone projecting downwardly through an associated valve seat which it normally engages and from which it separates so as to form an annular outlet channel leading to the outlet nipple as soon as, upon a pressure drop in that nipple, the supporting disk together with the valve cone has sufficiently overcome the spring pressure of the resilient bearing element.

The resilient element bearing the supporting disk may be either in the form of a helical compression spring or in the form of a valve member of resilient material whose inherent spring tension is sufficient to restore the supporting disk with the valve cone thereon to its original position when the pressures in the retarding chamber and in the outlet nipple are again balanced. When this resilient valve member is not under load from above, it preferably has an upwardly diverging, funnellike shape which is deformed when depressed by the supporting disk, the reduced lower tubular part of this valve member being rigidly connected to the outlet opening of the retarding chamber in the lower housing part; the intermediate part between the divergent portion and the reduced tubular neck forms the seat co-operating with the valve cone.

A modified outlet valve for a safety appliance according to the invention may comprise an annular valve member of resilient material whose center bore forms a fluid passage and which rises from the bottom of the retarding chamber around the outlet opening of the latter, curving inwardly and terminating in a bead coacting with a fixed rigid valve disk which has a sealing surface overhung by that bead. Radially beyond its sealing surface engageable by the bead of the valve member this valve disk is provided with flow ports through which the fluid may pass to the outlet opening of the appliance when the bead is lifted off the sealing surface, i.e. when the outlet valve is in its open position.

According to another feature of the invention, the safety appliance with the modified outlet valve is preferably provided with a check valve constituting an independently movable element separate from the outlet valve. This check valve is located between the fixed valve plate of the outlet valve and the outlet opening of the appliance and may consist, for example, of a fixed annular valve seat and a central valve disk of resilient material engageable with and disengageable from this valve seat.

The valve disk of the outlet valve according to this embodiment of the invention is further preferably provided with an axial bore which connects the retarding chamber with the space underneath the valve disk, i.e. the space between the valve disk and the outlet opening of the appliance. In this bore a resetting tappet is guided so as to be slidable in the axial direction, and preferably against the action of a restoring spring. The upper end of this tappet facing the retarding chamber is provided with an outwardly projecting flange which is slidable within an annular recess in the upper surface of the valve disk and whose underside normally bears upon a gasket ring which is inserted into this recess and seals the guide bore for the tappet against the retarding chamber.

According to another important feature of the invention, the retarding mechanism which may be associated with either of the outlet valves as above described comprises a control element which is movable toward the outlet valve at a rate proportional to the quantity of fluid flowing through the appliance. Such a system utilizes principles disclosed in my copending application Ser. No. 871,650 filed Nov. 13, 1969 as a continuation of my prior application Ser. No. 714,914 filed Mar. 12, 1968, both now abandoned.

This retarding mechanism may consist, for example, of an inverted solid supporting cup, mounted in a fixed position, and of a control diaphragm of resilient material which in its normal or inactive position is likewise cup-shaped and disposed within and covered by the supporting cup. These two elements are spaced from each other and form the walls of an intermediate control chamber connected with the antechamber by a small orifice in a tubular boss or thimble on the supporting cup which projects through the partition into the antechamber. Only part of the fluid therefore passes from the antechamber via the inlet valve into the retarding chamber and from the latter through the outlet valve, another part of the fluid flowing slowly from the antechamber through the by-pass orifice of the thimble into the control chamber and thereby increasing the volume of the latter by pressing the center of the control diaphragm in the toward the supporting disk of the outlet valve until it arrives in a terminal position in which only a small gap remains between the confronting surfaces of the central diaphragm part and the supporting disk. If owing to a defect in the line or the load connected to the safety appliance the flow of fluid is not shut off at this time by a demand valve in this line or load, a small amount of fluid continues to flow through this narrow gap and thereby permits the central diaphragm part to move further toward the supporting disk until the gap has been greatly reduced. When the central diaphragm part has reached this throttling position, the outlet valve will close suddenly and automatically. From the preceding description it is therefore evident that the maximum quantity of fluid which may pass in any event through the safety appliance is determined by the size of the small by-pass orifice through which a part of the fluid passes from the antechamber into the control chamber and thereby increases the volume of the latter until it has become so large that, if the discharge of fluid is not then interrupted by a downstream valve, the outlet valve of the appliance will be suddenly closed.

Another feature of the invention resides in the provision of suitable means for resetting the control diaphragm from its inverted and distended position to its normal position. For this purpose, the bottom wall of the supporting cup may be provided with an aperture forming a return-flow port which is adapted to be closed by a resetting valve member and through which, in its unblocked state and upon restoration of the control diaphragm to its normal position, the fluid may flow quickly back from the control chamber into the retarding chamber. The resetting member which is mounted on the partition opposite the return-flow port may be likewise designed as a diaphragm whose outer edge is secured to the side of the partition facing the antechamber and whose central part projects through an aperture in the partition toward the return-flow port.

These as well as further features and advantages of the present invention will become more clearly apparent from the following detailed description thereof, given with reference to the accompanying drawings in which.

Figure 1:
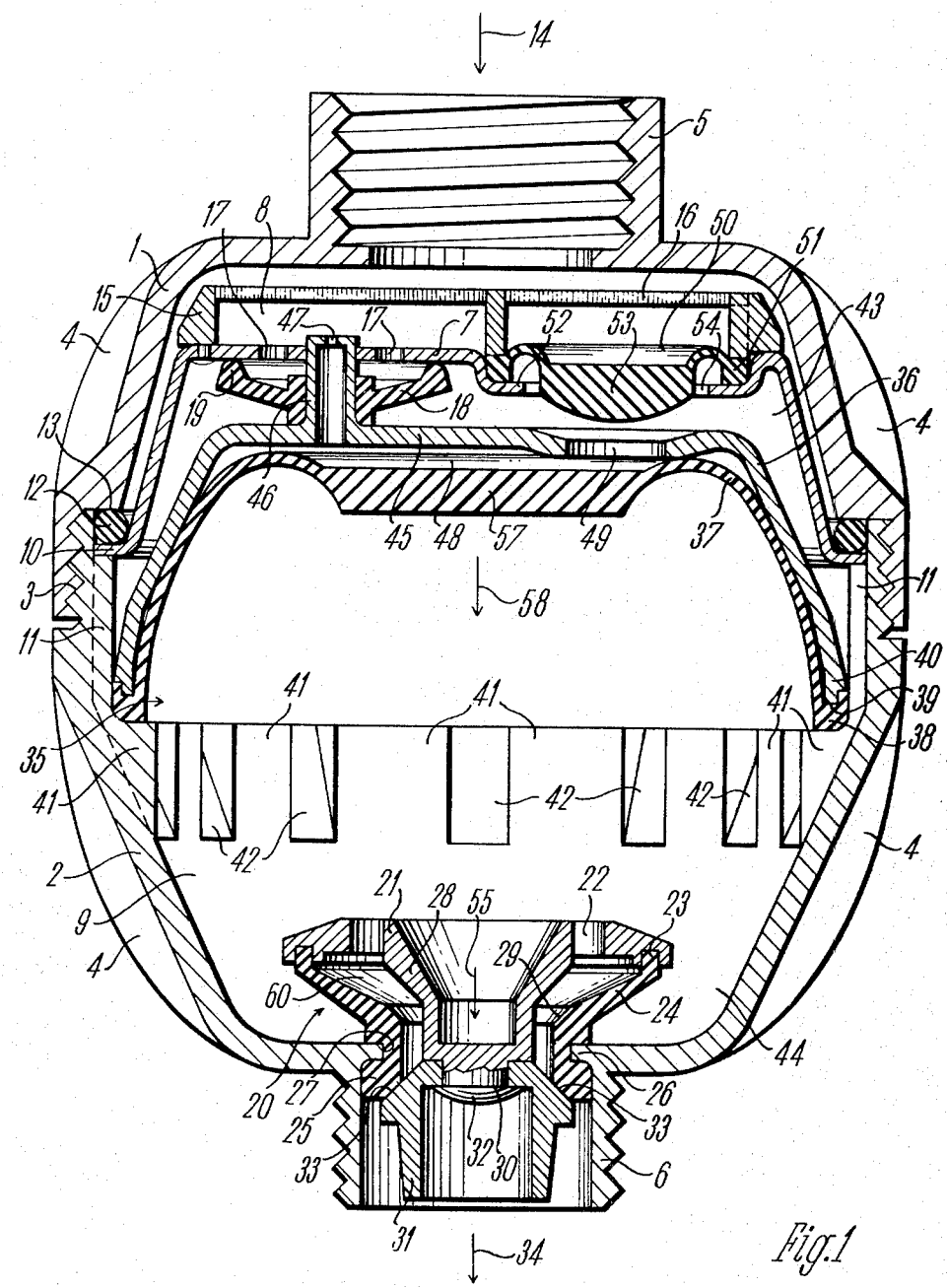
FIG. 1 shows a cross section of a safety appliance according to the invention in its neutral position.
Figure 2:
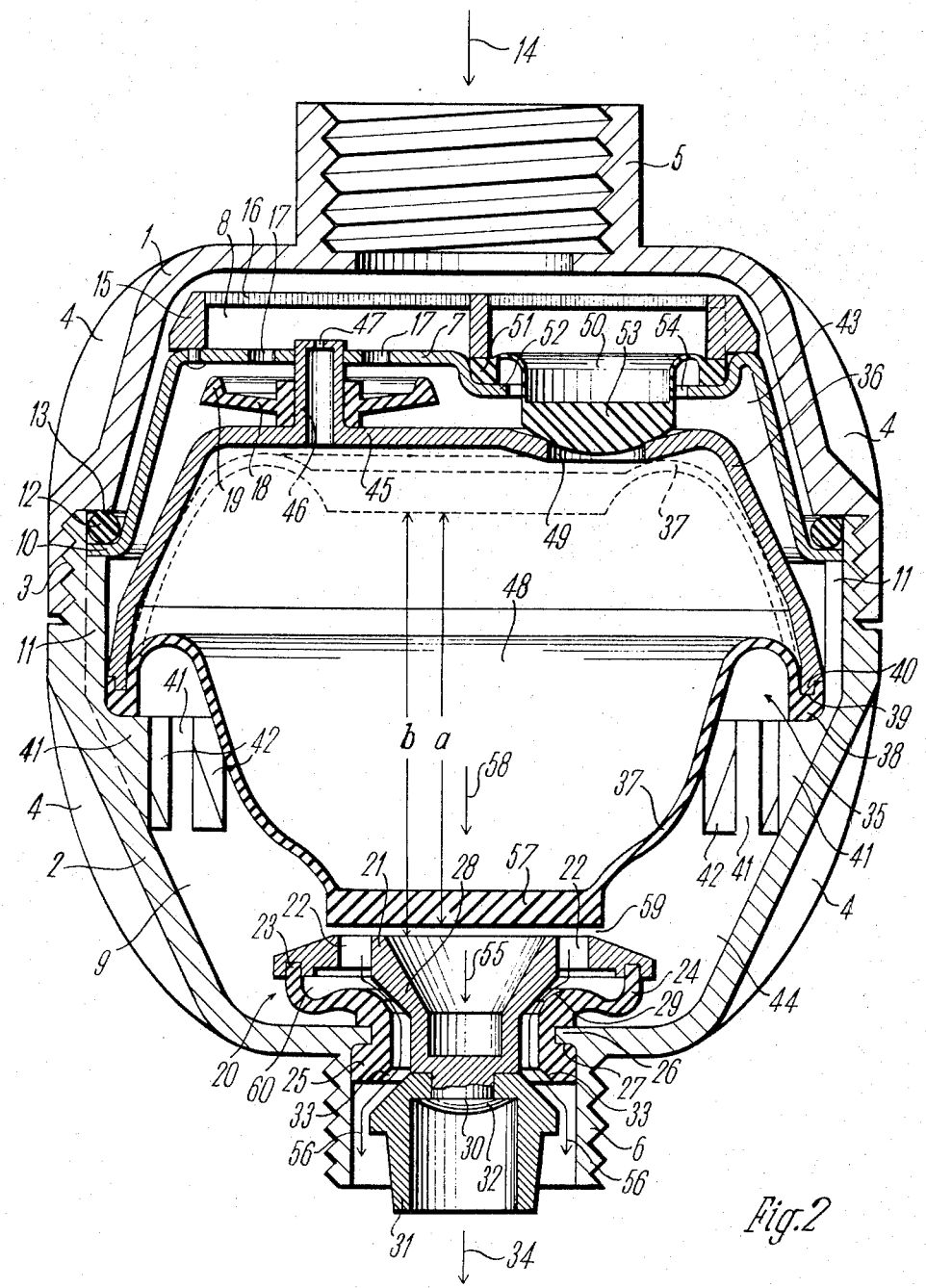
FIG. 2 shows another cross section of the same appliance in its free-flow position shortly before it arrives in its shut-off position.
Figure 3:
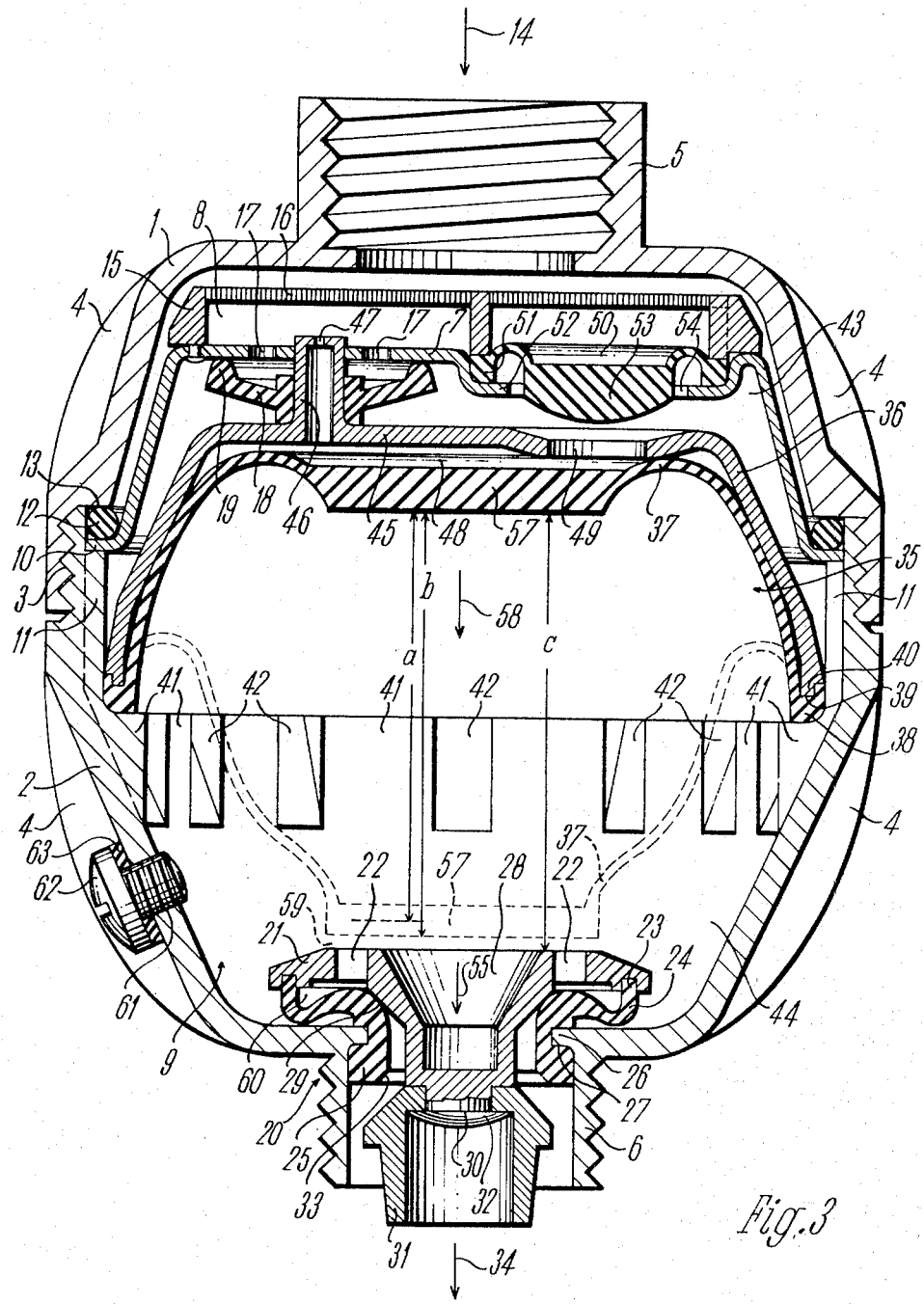
FIG. 3 shows another cross section of the same appliance in its shut-off position.

Reference will first be made particularly to FIGS. 1 to 3 of the drawing. As shown in these figures, a safety appliance according to the invention comprises two cup-shaped housing parts 1 and 2 which are screwed together in relatively inverted positions by a screw thread 3 and are externally provided with ribs 4 enabling these housing parts to be more firmly gripped. The upper housing part 1 is provided with an inlet nipple or part 5 and the lower housing part has an outlet nipple or part 6 by means of which the appliance may be screwed into a supply line for a liquid or gas.

The interior of the housing 1, 2 is divided by an inverted-cup-shaped partition 7 into an antechamber 8 facing the inlet port 5 and a retarding chamber 9 facing the outlet port 6. This partition 7 has an outwardly projecting rim 10 resting on a plurality of supporting ribs 11 which project radially from the inner wall of the housing part 2 and are peripherally spaced to form intermediate channels leading from an upper compartment 43 to a lower compartment 44 of chamber 9. On its upper surface, this rim 10 carries a continuous sealing ring 12 and presses the same tightly against an inner annular shoulder 13 on the wall of the housing part 1 when the two housing parts 1 and 2 are screwed together.

For preventing any solid impurities contained in the fluid stream entering the appliance, in the direction of the arrow 14, from reaching the more sensitive elements inside the appliance, the partition 7 carries on its side facing the inlet port 5 a frame 15 which holds a filter screen 16 in a manner making it easily removable for cleaning or replacement.

For passing the fluid from the antechamber 8 into the retarding chamber 9, the partition 7 is provided with perforations 17 co-operating with a valve cup 18 of elastic material having an upper rim 19 which, when this valve cup is in its inactive position as shown in FIG. 1, tightly engages the underside of the partition 7 and thus disconnects the perforations 17 from the retarding chamber 9.

In addition to this inlet valve which is formed by the perforations 17 and the resilient cup 18, the appliance is provided adjacent to the outlet port 6 with a fluid-blocking unit, generally designated 20, which comprises two valves, namely, an upper outlet valve and a lower check valve. The upper outlet valve, designed to close automatically when the predetermined or critical quantity of fluid has passed through the appliance, comprises a solid supporting disk 21 which is provided with a perforated band having ports 22 and bears tightly upon the rim 23 of a normally funnel-shaped valve member 24 of resilient material. This deformable valve member 24 has a reduced neck portion 25 with an outer peripheral groove 27 into which an inner flange 26 on the upper end of the outlet port 6 is tightly fitted. The rigid member 21 of the blocking valve 20 has an integrally depending valve cone 28 adapted to engage a tapered valve seat 29 which forms part of the resilient valve member 24 and from which it is normally spaced by an annular clearance at the lower end of a collapsible valve chamber 60 defined by members 21 and 24. The lower end 30 of this valve cone 28 carries a further valve cone 31 riveted thereto by a head 32. This valve cone 31 normally engages an outwardly flared valve seat 33 in the lower end of the resilient valve element 24 and both together form the above-mentioned check valve which prevents the fluid passing through the outlet nipple 6 in the direction of the arrow 34 from flowing in the reverse direction.

The chamber 9 formed between the blocking unit 20 and the partition 7 contains a retarding mechanism 35 which co-operates with that unit. This retarding mechanism 35 consists of an outer inverted supporting cup 36 of rigid material, constituting a rigid wall of chamber 9, and a likewise cup-shaped resilient control diaphragm 37 which in its inactive position, as shown in FIG. 1, rests within the concave side of the supporting cup 36. The outer rim 38 of diaphragm 37, supporting a thickened central part 57, is provided with an annular groove 39 in which the lower edge 40 of the supporting cup 36 engages and by means of which the diaphragm 37 together with the supporting cup 36 is mounted on the tops of a plurality of seat-forming ribs 41 which are integral with the housing part 2 and project radially inwardly from the peripheral wall thereof. Adjacent ribs 41 are spaced apart so as to form channels 42 which permit the fluid to pass from the upper part 43 of the interior of housing 1, 2 into a downstream compartment 44 of the retarding chamber 9 through the peripheral passage defined by the ribs 11.

The flat-topped central portion 45 of the supporting cup 36 is further provided with a tubular boss or thimble 46 which projects toward the partition 7 and whose upper ends, traversing this partition is provided with a throttle conduit in the form of a bore forming a throttled by-pass through which the antechamber 8 communicates with an upstream compartment or control chamber 48 intermediate the supporting cup 36 and the control diaphragm 37. This tubular boss or thimble 46 also serves as a support for the valve disk 18 of the above-mentioned inlet valve.

Laterally of the thimble 46, the flat top 45 of the supporting cup 36 is further provided with a return-flow port 49 adapted to be closed by a flexible membrane or diaphragm 50 which serves as a resetting valve. The outer edge 51 of this membrane forms a bead received in a depressed part 52 of the partition 7 in which it is secured by the screen frame 15 as shown in FIG. 1, the heavy central part 53 of this membrane located directly opposite the return-flow port 49, projects through an aperture 54 in the partition 7.

The mode of operation of the safety appliance according to the invention is as follows:

If the safety appliance as previously described is inserted, for example, into the water-supply line of a clothes or dish washer or into the supply line of any other fluid-consuming load in which it may be useful, and if on this machine, apparatus or other load all shutoff elements are closed, the normal supply pressure prevails in the inlet nipple 5, the antechamber 8, and the retarding chamber 9. However, in the outlet port 6 and in the associated discharge line a slightly lower pressure prevails. The difference in pressure is due to the inherent spring tension of the resilient valve element 24 which determines the sealing pressure of the valve cone 31 of the check valve. All parts of the safety appliance are at this time in their normal positions, shown in FIG. 1, in which the upper rim 19 of the resilient valve disk 18 bears with a small inherent pressure against the partition 7 and thereby interrupts the connection between the antechamber 8 and the retarding chamber 9 through the perforations 17. A pressure balance between the antechamber 8 and the retarding chamber 9 is then established through the small by-pass bore 47, the thimble 46, the control chamber 48 and the return-flow port 49.

If at a location downstream of the safety appliance a shutoff element, such as a solenoid valve or possibly a manually operated valve, is opened or if in the line connecting the outlet port 6 with such a valve some damage occurs which results in a leakage to the outside, the pressure drops in the outlet port 6. Since the retarding chamber 9 then is under a higher pressure than in the outlet port 6 and the discharge line connected thereto, this overpressure in chamber 9 causes the supporting plate 21 together with the two valve cones 28 and 31 of the blocking unit 20 to be shifted against the spring action of the resilient valve element 24 in the direction of the arrow 55 into the position of this blocking unit illustrated in FIG. 2 in which valve cones 28 and 31 are separated from their seats 29 and 33, respectively, so that the fluid contained in the retarding chamber 9 can flow off in the direction of the arrows 56.

The discharge of the fluid from the retarding chamber 9 through the opened valve unit 20 causes, however, also a drop in pressure in this chamber 9 so that owing to the resulting overpressure which then acts through the inlet ports 17, the upper rim 19 of valve disk 18 separates from the partition 7 in the manner shown in FIG. 2 and thereby permits an additional fluid flow from the antechamber 8 into the retarding chamber 9.

As already noted, the upstream compartment 48 defined by the supporting cup 36 and the diaphragm 37 communicates through the restricted by-pass bore 47 of the thimble 46 directly with the antechamber 8. Since this chamber 8 and thus also the control chamber 48 are under an overpressure exceeding the pressure in the retarding chamber 9, the central part 57 of diaphragm 37 will now be lowered in the direction of the arrow 58. Since the fluid can pass only slowly through by pass bore 47 into the control chamber 48 to increase the volume of this chamber, a certain period of time is required until the diaphragm 37 will reach its alternate position adjacent the perforated band of disk 21 as illustrated in FIG. 2. During this period, the fluid via inlet port 5 will flow continuously through the apertures 17 and the channels 42 into the downstream compartment 44 of the retarding chamber 9 from which it then passes in the direction of the arrows 56 through the opened valve unit 20 into the outlet port 6 and then to the load therebeyond.

Since the rate of descent of the central part 57 of the control diaphragm 37 toward the supporting plate 21 of valve 20 and thus also the quantity of fluid passing during this time through the retarding chamber 9 to the load depend upon the volume of upstream compartment 48 and thus also upon the size of the bore 47, this bore should be so restricted that the quantity of fluid required by the load has already traversed and left the safety appliance before the central part 57 of diaphragm 37 has traveled the distance $a$ and has reached the position proximal to plate 21 in which it is shown in FIG. 2.

When the desired amount of fluid has passed through the safety appliance and the demand valve downstream of the outlet port 6 is then closed, the supply pressure will at first be built up in the line leading from the safety appliance to this valve and also in the outlet port 6 and the retarding chamber 9 so that a pressure balance is re-established in the entire system. Because of this pressure balance, the inherent spring action of the resilient elements will again become effective so that not only valve member 24 will assume its original funnel-shape, thereby re-expanding the collapsed valve chamber 60, but also the diaphragms 37 and 50 and valve disk 18 will return to their original positions as shown in FIG. 1. The return of valve member 24 also causes the restoration to normal of the supporting disk 21 together with valve cones 28 and 31 so that valve cone 31 will be retracted to its closure position. The upper edge 19 of valve disk 18 is then also again applied against the partition 7 and thereby interrupts the further supply of fluid through the ports 17. Furthermore, owing to the resilience of diaphragm 37, its flat central part 57 also returns to its original position and thereby pumps the fluid from the control chamber 48 through the now opened return-flow port 49 back into the retarding chamber 9. As soon as the control diaphragm 37 has returned to its normal position as shown in FIG. 1, the safety appliance is again ready for operation to permit the predetermined maximum quantity of fluid to pass through it.

If, however, the demand valve at the point of fluid consumption does not close at the proper time or closes only partly, or if there is a leakage in the line leaving the appliance, the aforedescribed pressure balance does not occur, the central part 57 of the control diaphragm having moved downwardly by the distance $a$, is then in the position shown in FIG. 2 in which the flow of the fluid to the outlet valve 20 must traverse the narrow annular gap 59 between the flat part 57 and the perforated band of disk 21 so that this flow is strongly reduced. This, in turn, results in an additional pressure drop in the outlet 6 and the associated discharge line relative to the pressure in the adjacent compartment 44 of the retarding chamber 9. This additional pressure drop at first causes a small further movement of the supporting disk 21 and the two valve cones 28 and 31 in the direction of the arrow 53. The central diaphragm part 57 then follows the descent of disk 21 until it has completed its maximum stroke $b$. Since by the downward movement of disk 21 the valve cone 28 is likewise shifted, the width of the flow channel between this valve cone 28 and the valve seat 29 will also be reduced which, in turn, results in an additional pressure drop in the outlet 6 and the line serving the load. As soon as the difference in pressure between the compartment 44 and the outlet port 6 has become so large as to overcome the spring tension of the resilient valve member 24, the supporting disk 21 together with the two valve cones 28 and 31 will be moved rapidly, with a snap or toggle action, in the direction of the arrow 55 to the closure position shown in FIG. 3 in which the valve cone 28 is in tight sealing engagement with the valve seat 29 and the collapse of chamber 60 prevents any further flow of fluid from the safety appliance toward the load. Since the central part 57 of the control diaphragm 37 can move in the direction of the arrow 58 only at a rate proportional to the additional flow of fluid through the bore 47 into the control chamber 48, the central diaphragm part 57 can no longer follow the supporting disk 21 during this last phase of the movement of the latter and therefore completes its travel from the position $a$ of FIG. 2 to the end of its stroke $b$ as soon as the valve cone 28 bears tightly upon its seat 29. The outlet valve 20 has thus carried out its purpose and is closed.

After the valve cone 28 has closed the outlet valve 20, a pressure balance occurs between the two compartments 43 and 44 of the retarding chamber 9, chamber 60 above the valve seat 29, and the control chamber 48 so that valve disk 18 and diaphragm 50 and then also the control diaphragm 37 will return to their original positions as shown in FIG. 3. Valve cone 28 remains, however, in its closed position until the cause of the defect has been determined and eliminated.

After the defect in the load or in the line leading thereto from the outlet port 6 has been cured, valve 20 should be reset to its original position shown in FIG. 1 in the manner described below. For this purpose, a valve or faucet upstream of the safety appliance should first be closed and the discharge line leading from the appliance to the load should be disconnected from the outlet port 6 so that the lower valve cone 31 will be accessible from below. By pressing this cone 31 upwardly by hand, both valve cones 31 and 28 will be moved back to the free-flow position shown in FIG. 2 so that the difference in pressure between this chamber and the outlet port will be relieved and the resilience of valve member 24 will become effective to push the supporting disk 21 and the two valve cones 28 and 31 thereon back to the original position shown in FIG. 1. The safety appliance is then again ready for operation, the discharge line may again be connected to the outlet 6, and the faucet or valve upstream of the inlet 5 may again be opened.

FIG. 3 also illustrates another arrangement by in which the valve unit 20 may be reset from the closure position of valve cone 28 on its valve seat 29 to its original position shown in FIG. 1. The wall of the lower housing part 2 is for this purpose provided with a tapped bore 61 plugged by a screw 62, carrying a gasket ring 63, which may be easily unscrewed from the outside so that the housing 1, 2 and thus the retarding chamber 9 will be vented to the atmosphere and the spring tension of valve member 24 will return the valve unit 20 to its normal position according to FIG. 1 without requiring the discharge line to be disconnected from the outlet port 6.

Figure 4:
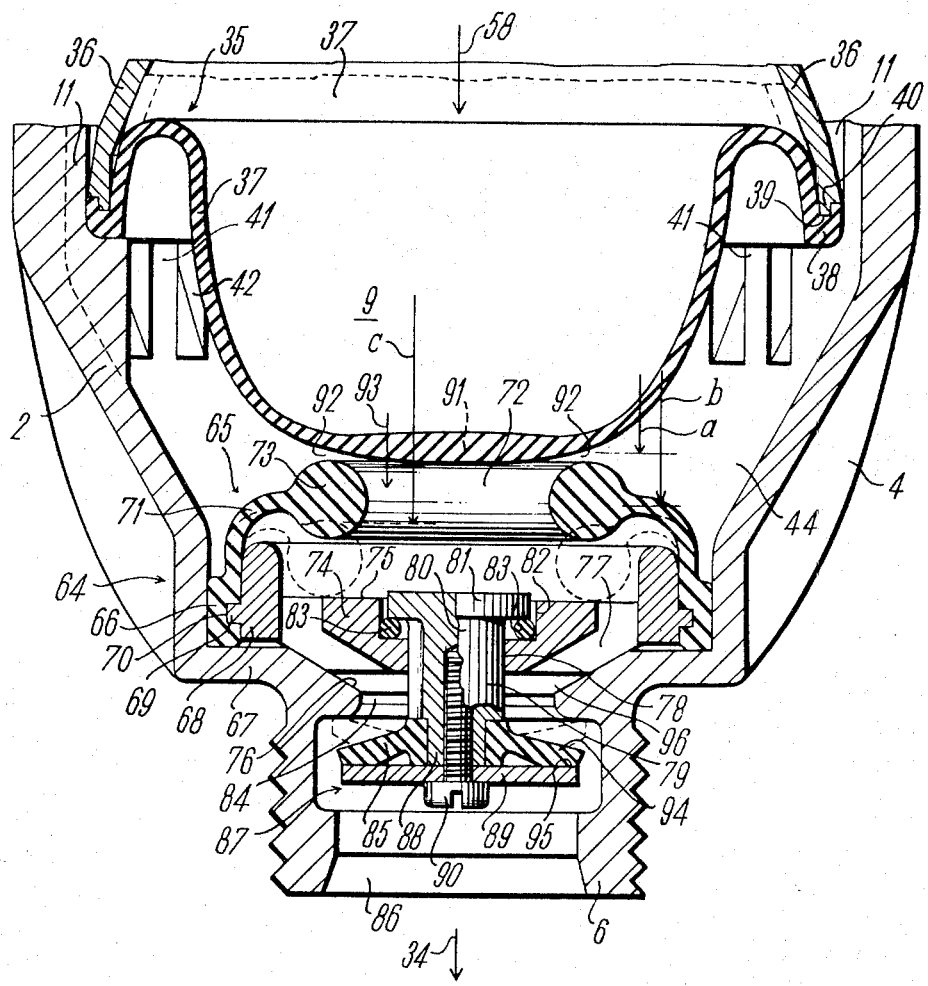
FIG. 4 shows a cross section of the main part of the appliance in the position seen in FIG. 2 but with modification of its outlet valve.

FIG. 4 finally illustrates the lower part of a safety appliance similar to the one previously described and in a position analogous to that shown in FIG. 2. The parts of this appliance which correspond to those shown in FIGS. 1 to 3 are also designated by the same reference numerals. This safety appliance is, however, provided with a blocking unit 64 of a construction different from that of the aforedescribed blocking unit 20 although its functions are the same. This valve unit 64 comprises an annular blocking member 65 of resilient material which has an outer rim portion 66 fitted into the bottom part 67 of the lower end of the housing part 2 which in the case is of cylindrical shape. This rim portion 66 is further held in a fixed position by an inner clamping ring 68 which presses the rim portion 66 into tight sealing engagement with the bottom part 67 by means of an annular projection 69 on ring 68 received in an annular groove 70 in the inner periphery of the rim portion 66. The resilient valve member 65 further comprises a bead constituting a relatively heavy sealing ring 73 whose central opening or perforation 72 forms a fluid passage in line with outlet 6. This sealing ring 73 is coaxial with and of a smaller diameter than ring 68 and rim portion 66 and is integrally connected to the latter by a downwardly curved web 71.

Underneath and opposite this sealing ring 73 of valve member 65 a solid valve disk 74 is secured to and projects inwardly from the clamping ring disk 74 has an upper sealing surface 75 onto which the bead 73 is adapted to be pressed in sealing engagement as indicated in dotted lines in FIG. 4. Valve disk 74, which rests on the conical inner surface 76 of the part connecting the bottom 67 of the housing part 2 with the outlet port 6, is further provided at locations radially outward of its annular face 75 with flow channels 77 which connect the space within and underneath the central opening 72 of sealing ring 73 with the interior of the outlet 6.

Valve disk 74 is further provided with an axial bore 78 whose wall guides with clearance, as shown, a longitudinally slidable resetting tappet 79 terminating at its upper end 80 in a radially projecting flange 81 which is disposed within an annular recess 82 in the valve disk 74 and normally rests on a gasket ring 83; the latter, in turn, rests on the bottom of this recess in contact with the peripheral wall thereof and seals the bore 78 against the retarding chamber 9.

As further illustrated in FIG. 4, the outlet 6 is peripherally recessed underneath the constricted throat forming the conical surface 76 which supports the valve disk 74; the upper boundary of this annular recess forms a valve seat 84 co-operating with a central valve disk 85 of resilient material which is shown in full lines in its open position and in dotted lines in its closed position and which together with this valve seat 84 forms a check valve between the valve member 65 and the discharge opening 86 of the outlet port 6. This resilient valve disk 85 is of a very simple construction and has a central aperture traversed by a neck portion 88 of reduced diameter on the lower end of the resetting tappet 79, being secured on this neck portion 88 by a metal disk 89 which forms a deflector-limiting abutment for valve disk 85 and is firmly secured by a screw 90 to the tappet 79 representing a slidable extension of rigid valve member 74.

The mode of operation of this valve unit 64 is similar to that of the valve unit 20 as described with reference to FIGS. 1 to 3. If the central part 91 of the control diaphragm 37 is moved from its inactive position, corresponding to that of the central diaphragm part 57 in FIGS. 1 and 3 in the direction of the arrow 58 over the entire distance $a$ to the position shown in full lines in FIG. 4, the width of the annular gap 92 between the lower surface of the central diaphragm part 57 and the upper surface of the sealing ring 73 will also in this case be considerably reduced with the result that, by virtue of the pressure drop downstream of the gap 92, the sealing ring 73 will be lowered in the direction of the arrow 93 toward the resilient valve disk 85. The central diaphragm part 91 also trails in this case (arrow C) behind the downwardly moving sealing ring 73 until the latter tightly engages the sealing surface 75 of the fixed valve disk 74, as indicated in dotted lines in FIG. 4, and prevents any further flow of fluid from the retarding chamber 9 to the outlet opening 86 of the port 6 without requiring the arched central diaphragm part 91 to engage the sealing ring 73. As soon as the sealing ring 73 reaches its closure position indicated in FIG. 4 in dotted lines, the resilient valve disk 85 will also return to its blocking position as also shown in dotted lines. The valve unit 64 has thus completed its intended function and has shut off the fluid flow. As soon as this occurs, the pressure balance is re-established as already described above so that valve disk 18 and diaphragm 50 and then also the control diaphragm 37 will return to their original inactive positions as shown in FIGS. 1 and 3.

The operation of the resilient valve disk 85 of check valve 87 between valve 64 and the outlet opening 86 of port 6 is controlled in the same manner as that of any other check valve, namely, merely by the pressures which act upon the opposite sides of valve disk 85. When this valve disk 85 is in its open position as shown in full lines in FIG. 4, it bears upon the upper surface 95 of the metal disk 89, while in its closed position as indicated in dotted lines the outer edge 94 of valve disk 85 is tightly pressed against the valve seat 84; the resilience of this disk then also holds the flanges 81 in contact with gasket rint 83.

If after the occurrence of some defect in the load served by the safety appliance, or in the line leading thereto from the outlet port 6, the valve 65 has automatically closed and the defect has then been eliminated, the sealing ring 73 of valve 65 should again be moved to its open position; first, however, the faucet or valve ahead of the safety appliance is closed and the outlet line is disconnected from the port 6, whereupon pressure is exerted upon the head of screw 90 in the direction opposite arrow 93 so that the resetting tappet 79 will be shifted in its axial direction and its flange 81 will thereby be lifted off the gasket ring 83. This results in a pressure equalization through the bore 78 between the retarding chamber 9 and an annular chamber 96 communicating with this bore and the channels 75 at a level above the check valve 87. When this pressure balance has been established, the sealing ring 73 is returned by the resilience of its connecting web 71 to its normal raised position as shown in full lines in FIG. 4.

After the safety appliance has been in operation for a certain length of time, it may be necessary to clean or exchange the filter screen 16 shown in FIGS. 1 to 3. For this purpose it is only necessary first to shut off the valve or faucet upstream of the appliance and to disconnect the line leading to the load from the outlet port socket 6 and then to unscrew and remove the lower housing part 2 from the upper-housing part 1 and thereby also to withdraw all of the internal elements of the appliance which are contained in or held in position by the lower housing part 2 so that the screen 16 may then be easily removed and either cleaned or exchanged for another one. Thereafter, the previously detached internal elements may again be easily reassembled and replaced in the housing whose two parts are then screwed together, whereupon the line leading to the load may be reconnected to the outlet nipple 6.

Although my invention has been illustrated and described with reference to certain preferred embodiments thereof, I wish to have it understood that it is in no way limited to the details of such embodiments but is capable of numerous modifications within the scope of the appended claims.

Having thus fully disclosed my invention, I claim:

1. A safety appliance for controlling the flow of a fluid under pressure, comprising:

a housing having an inlet port connectable to a source of high-pressure fluid, an outlet port connectable to a fluid-consuming load, and a flow path between said ports including a peripheral passage, said housing being further provided with a retarding chamber open toward said outlet port;

diaphragm means in said retarding chamber subdividing same into an upstream compartment and a downstream compartment, said diaphragm means being biased into a normal position of minimum volume for said upstream compartment, said downstream compartment communicating with said flow path at a location beyond said passage;

throttled conduit means between said inlet port and said upstream compartment for building up a pressure differential across said diaphragm means, tending to displace same into an alternate position of maximum volume for said upstream compartment, upon a discharge of fluid through said outlet port;

and blocking means for said outlet port including a rigid member and an elastically deformable member subjected to the fluid pressure prevailing in said downstream compartment, said members being relatively movable in response to such fluid pressure and defining between them a collapsible valve chamber interposed in said flow path between said retarding chamber and said outlet port, one of said members having at least one normally unobstructed perforation connecting said downstream compartment with said valve chamber, said perforation being sufficiently obstructed by said diaphragm means in said alternate position thereof for reducing the pressure in said valve chamber to collapse the latter, thereby interrupting the fluid flow from said retarding chamber to said outlet port after a delay determined by the flow resistance of said throttled conduit means.

2. A safety appliance as defined in claim 1, further comprising valve means in said flow path normally blocking the flow of fluid from said inlet port to said downstream compartment, said valve means being sensitive to the development of a pressure difference between said ports for facilitating such flow.

3. A safety appliance as defined in claim 2 wherein said valve means comprises a perforated partition in said housing confronting said inlet port and a resilient valve cup normally contacting said partition on the side thereof remote from said inlet port, said conduit means traversing said partition.

4. A safety appliance as defined in claim 3 wherein said conduit means comprises a thimble passing centrally through said valve cup and rising from a wall of retarding chamber.

5. A safety appliance as defined in claim 3 wherein said retarding chamber has a wall provided with a return-flow port confronting said partition, the latter being partly formed by a flexible membrane responsive to said pressure difference for blocking said return-flow port concurrently with the unblocking of the fluid flow from said inlet port to said downstream compartment by said valve cup.

6. A safety appliance as defined in claim 5 wherein said partition has a depression with a bottom aperture overlying said return-flow port, said membrane being peripherally secured to said partition in said depression on the side proximal to said inlet port and having a central portion projecting through said aperture toward said return-flow port.

7. A safety appliance as defined in claim 5, further comprising a filter screen on said partition overlying said membrane and said valve means on the side of said inlet port.

8. A safety appliance as defined in claim 5 wherein said housing is divided into a first part provided with said inlet port and a second part provided with said outlet port, said parts being detachably secured to each other, said wall being removably mounted in said second part, said partition being clamped in position between said parts.

9. A safety appliance as defined in claim 8 wherein said parts are threadedly interconnected and are provided with external ribs for manual relative rotation.

10. A safety appliance as defined in claim 8 wherein said second part has an inner peripheral surface forming a seat for said wall, said seat being provided with peripherally spaced channels forming part of said flow path.

11. A safety appliance as defined in claim 10 wherein said diaphragm means comprises a resilient diaphragm provided with a peripheral bead clamped in position between said seat and said wall.

12. A safety appliance as defined in claim 11 wherein said wall is generally bowl-shaped with a concave side facing said outlet port, said diaphragm being normally curved toward said inlet port and received in said concave side.

13. A safety appliance as defined in claim 12 wherein said diaphragm has a thickened central portion substantially coextensive with a land of said one of said members formed with said normally unobstructed perforation.

14. A safety appliance as defined in claim 13 wherein said rigid member is yieldably supported on an end wall of said second part by said elastically deformable member.

15. A safety appliance as defined in claim 14 wherein the other of said members is peripherally joined to said one of said members around said land thereof and converges toward said outlet port while forming therein a reduced neck portion, said one of said members having a cone within said land normally separated by an annular clearance from said neck portion but coming to rest thereon upon the collapse of said valve chamber, thereby eliminating said clearance.

16. A safety appliance as defined in claim 15 wherein said neck portion terminates in an outwardly facing annular valve seat within said outlet port, said cone being provided with a diverging outward extension beyond said neck portion normally bearing yieldably upon said valve seat for preventing a reversal of flow through said outlet port.

17. A safety appliance as defined in claim 1 wherein said members are coaxially disposed at the entrance of said outlet port.

18. A safety appliance as defined in claim 17, further including a check valve in said outlet port beyond said blocking means, said rigid member being provided with an axial extension forming part of said check valve.

19. A safety appliance as defined in claim 18 wherein said outlet port is formed with an inner peripheral recess bounded by an outwardly facing shoulder, said extension including a resilient disk normally bearing upon said shoulder while being outwardly deflectable therefrom by the pressure of outflowing fluid.

20. A safety appliance as defined in claim 19 wherein said extension is further provided with abutment means for limiting the outward deflection of said disk.

21. A safety appliance as defined in claim 18 wherein said extension is mounted for axial inward movement to open a venting path for said valve chamber upon the collapse of the latter.

22. A safety appliance as defined in claim 21 wherein said check valve includes resilient means resisting inward movement of said extension, the latter being slidably guided in said rigid member and being provided with sealing means normally closing said venting path.

23. A safety appliance as defined in claim 22 wherein said rigid member has a central bore receiving said extension with clearance, an annular inward face surrounding said bore, and at least one outer channel merging with said bore inside said outlet port, said deformable member enveloping said rigid member and being provided with an annular bead overlying said annular face and bounding a central perforation normally communicating with said channel, said bead coming to rest on said face upon the collapse of said valve chamber, thereby isolating said channel from said central perforation.

24. A safety appliance as defined in claim 23 wherein said bore terminates in a recess open toward said central perforation, said extension being provided with a radial flange received in said recess, said sealing means including a gasket ring in said recess overlain by said flange under pressure of said resilient means.

25. A safety appliance as defined in claim 1 wherein said housing is provided with a normally plugged venting hole giving access to said downstream compartment for relieving the fluid pressure therein upon the collapse of said valve chamber.

* * * * *